C. DEAVS & W. S. BRAZIER.
Stuffing-Box and Packing for Valve-Stems.
No. 209,160.  Patented Oct. 22, 1878.
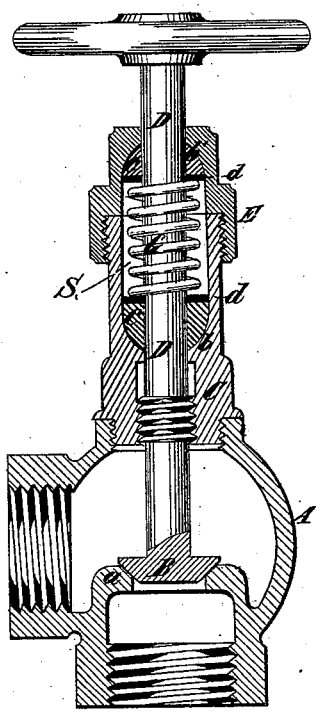
Witnesses:
Chandler Call
Thomas E. Birch.
Inventor
Charles Deavs
William S. Brazier
by their Attorney.
Edwin H Brown.

UNITED STATES PATENT OFFICE.

CHARLES DEAVS AND WILLIAM S. BRAZIER, OF NEW YORK, N. Y.

IMPROVEMENT IN STUFFING-BOXES AND PACKING FOR VALVE-STEMS.

Specification forming part of Letters Patent No. 209,160, dated October 22, 1878; application filed April 4, 1878.

*To all whom it may concern:*

Be it known that we, CHARLES DEAVS and WILLIAM S. BRAZIER, of the city, county, and State of New York, have invented certain new and useful Improvements in Stuffing-Boxes and Packings for the Stems of Globe, Angle, and other Valves, of which the following is a specification:

The object of this invention is to provide for packing globe, angle, and other valves more effectually than they have hitherto been packed, in order to obviate the leakage which almost invariably occurs.

To this end the invention consists in the combination, with the stem of a valve, of a conoidal-ended stuffing-box, extending partially into the bonnet of the valve, and partially into a cap fitting on said bonnet with a face-joint, provided with packing material and a spiral spring, having preferably on each end a metal washer, whereby the desired result is attained.

The invention also consists in details of construction to be hereinafter explained.

The accompanying drawing represents a central vertical section of an angle-valve embodying the invention.

A designates the body of the valve, which may be of any suitable form and material. B designates the disk of the valve. It operates in connection with a seat, $a$, and is connected to a stem, D, provided with a screw-threaded boss or portion which engages with a screw-thread in the bonnet C of the valve through which the stem D passes.

E designates the cap of the valve-bonnet. It is screwed onto the upper portion of the bonnet C, and provided with a shoulder fitting upon the top of the bonnet, and forming therewith a tight face-joint, precluding leakage between the bonnet and cap, and acting as a jam-nut to prevent the cap from backing off the bonnet when the valve is opened.

S designates a stuffing-box, having conoidal or rounded ends, and formed partly in the bonnet C and partly in the cap E. In the lower end or both the lower and upper ends of this stuffing-box packing material $c$ is fitted, and upon being subjected to pressure is caused to hug the stem D tightly and preclude leakage around it.

G designates a spiral spring, with a metal washer attached preferably to each end, so as to distribute the force of the spring equally over the surface of the packing $c$, and so arranged as to force the packings snugly into the conoidal ends of the stuffing-box, and at the same time take up by the expansion of the spring whatever contraction may occur in said packings.

It will be seen that by our invention we provide for a double packing in the stuffing-box, thereby reducing the liability of leakage; that we produce a valve which is very easily and conveniently packed; that by making the cap so as to screw down face to face on the bonnet we make it act as a jam-nut, thereby preventing it from backing off the bonnet when the valve is opened, besides preventing any leakage at the joint of the cap should any take place in the lower packing; and that we provide for compensating for whatever contraction may occur in the packing by the expansion of the spring bearing against it.

It is obvious that a packing in only one end of the stuffing-box may be sufficient in some cases, and that our invention is applicable to various apparatus used with water and steam.

What we claim as our invention, and desire to secure by Letters Patent, is—

1. The combination, with the stem of a globe or angle valve, or analogous article, of a bonnet and a cap therefor fitted together with a face-joint, and containing a stuffing-box formed partly in the bonnet and partly in the cap, and fitted with packing material and a spring, substantially as specified.

2. The combination of the body A of a globe or angle valve, or analogous article, the bonnet C, provided with an internally screw-threaded portion or nut, the stuffing-box S, having a conoidal end, the cap E, the packing material $c$, and interposed spring G, substantially as specified.

CHARLES DEAVS.
W. S. BRAZIER.

Witnesses:
CHANDLER HALL,
THOMAS E. BIRCH.